United States Patent [19]

Bolen

[11] Patent Number: 5,171,157
[45] Date of Patent: Dec. 15, 1992

[54] CLOCK SPRING INTERCONNECTOR WITH REUSABLE LOCKING MEANS

[75] Inventor: Pat A. Bolen, Carthage, Ill.

[73] Assignee: Methode Electronics, Inc., Chicago, Ill.

[21] Appl. No.: 784,089

[22] Filed: Oct. 30, 1991

Related U.S. Application Data

[63] Continuation of Ser. No. 592,812, Oct. 4, 1990, abandoned.

[51] Int. Cl.⁵ .............................................. H01R 35/04
[52] U.S. Cl. ...................................... 439/164; 439/15
[58] Field of Search ...................... 439/15, 22, 27, 162, 439/164

[56] References Cited

U.S. PATENT DOCUMENTS

| | | | |
|---|---|---|---|
| 4,417,775 | 11/1983 | Sakurai et al. | 439/15 |
| 4,722,690 | 2/1988 | Priede | 439/15 |
| 4,735,573 | 4/1988 | Zeller et al. | 439/15 |
| 4,797,109 | 1/1989 | Wende | 439/15 |
| 4,919,620 | 4/1990 | Yamaguchi et al. | 439/15 |
| 4,966,334 | 10/1990 | Bannai | 439/15 |
| 5,061,195 | 10/1991 | Bolen | 439/164 |

OTHER PUBLICATIONS

U.S. Patent Application Ser. No. 07/567,716 by Pat A. Bolen, "Clock Spring Housing and Assembly".

Primary Examiner—Larry I. Schwartz
Assistant Examiner—Kevin J. Carroll
Attorney, Agent, or Firm—Allegretti & Witcoff, Ltd.

[57] ABSTRACT

A clock spring interconnector for providing an electrical connection between a rotating and stationary electrical circuit. The clock spring interconnector has a rotating hub attached to a housing and containing a coiled conducting means. The clock spring interconnector has one or more spring loaded locking devices which prevent the hub from rotating whenever the clock spring interconnector is divorced from the rotating and stationary devices.

6 Claims, 4 Drawing Sheets

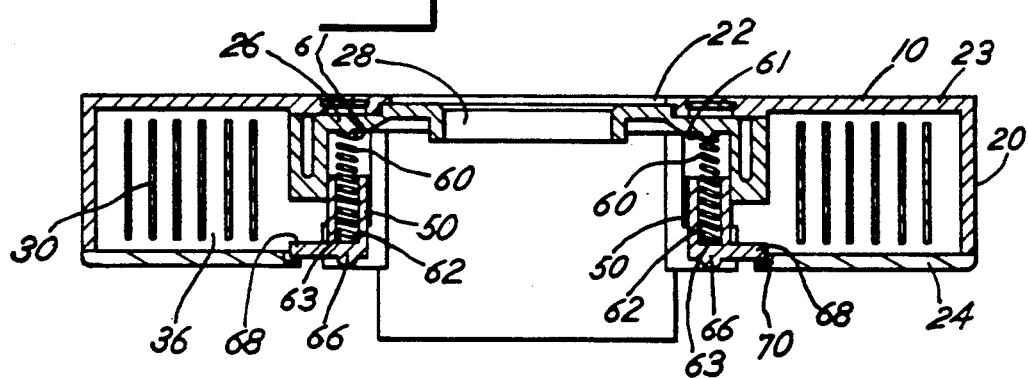
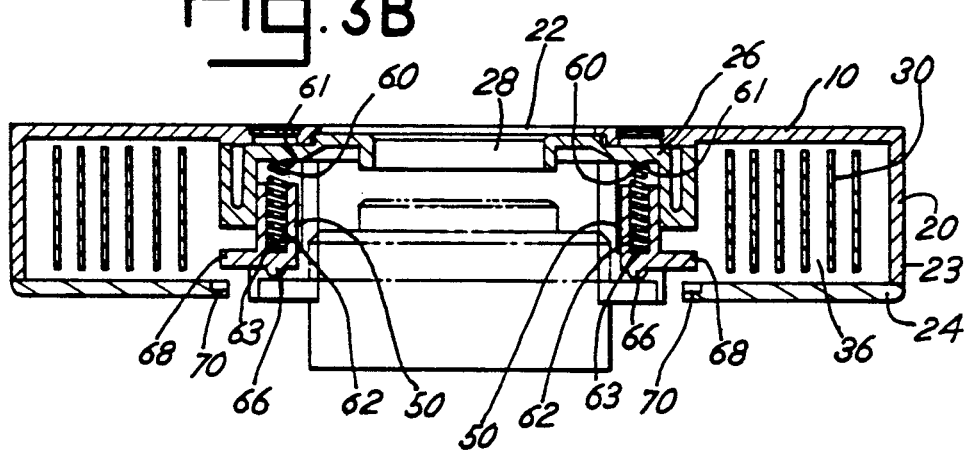
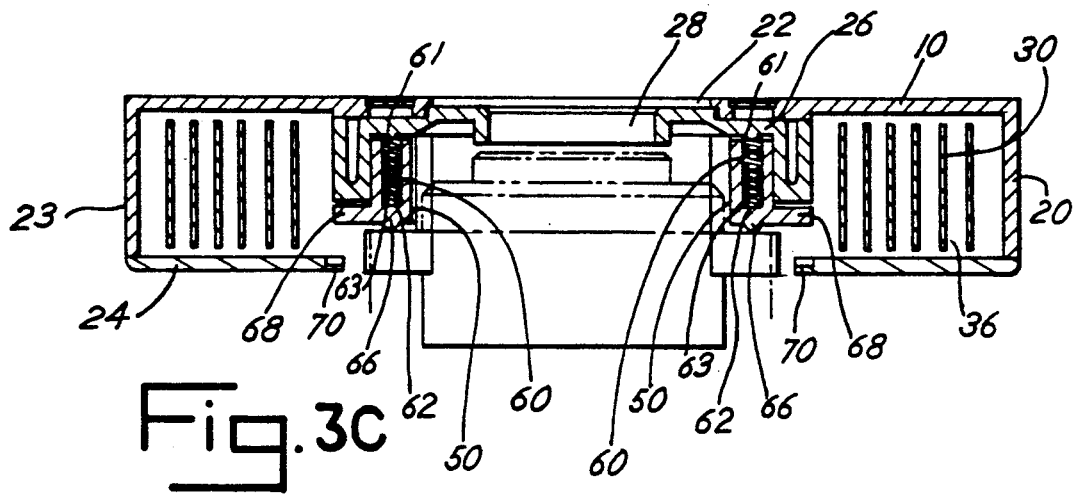

CLOCK SPRING INTERCONNECTOR WITH REUSABLE LOCKING MEANS

This is a continuation of application Ser. No. 592,812, filed Oct. 4, 1990, now abandoned.

BACKGROUND OF THE INVENTION

1. Field of the Invention

The invention is a clock spring interconnector for enclosing an electrical connector, the clock spring interconnector electrically connecting a rotatable electric device with a stationary electric device.

An increasing number of automobiles have air bag crash systems. An air bag is typically located on the steering wheel facing the driver. The air bag must be in continuous electrical connection with sensors in the car body. The sensors provide an electrical signal to the air bag crash assembly which instantly inflates the air bag in the event of a crash.

Accordingly, there is a need for an electrical connection between the rotatable portion of the air bag assembly which is mounted on the steering wheel, and the remaining portion of the assembly which is in a stationary position in the car body. Electrical connections between rotatable and stationary parts are well known. Typically, an electrical brush rests upon a conductive ring, with one of the parts being rotatable to provide such rotatable electrical connection. However, there is a risk, particularly during the impact of an accident, of a transient failure of electrical connection with a brush and ring system, which would result in failure of the entire air bag system crash assembly.

Accordingly, a clock spring interconnector has been previously developed, comprising an outer housing and a rotor member, the housing and rotor member rotatably associated with one another at a plurality of bearing surfaces. A "clock spring" is located inside the interconnector, the clock spring has two ends conductively attached to conductor wires which pass out of the interconnector to unite the air bag to the sensing device. The interconnector is mounted on the steering column, and the steering wheel may be rotated in either direction while a continuous, positive electrical connection is provided between air bag and sensors via the clock spring interconnector.

While prior art clock spring interconnectors are effective to provide the necessary continuous electrical connection between an air bag or other device on a rotating column and a stationary portion of a circuit, the prior art systems were sometimes wound completely tight before the device was installed making the installed device useless. This problem was partially solved by providing a clock spring assembly with a device that kept the clock spring interconnector from rotating prior to installation. The locking device was destroyed when the clock spring was installed on a rotatable columns. However, the interconnector then became susceptible to over winding and failure if the interconnector was subsequently removed from the column.

2. Prior Art

U.S. Pat. No. 4,722,690 describes a clock spring interconnector which includes a projection locking the rotating portion of the clock spring assembly in a stationary position prior to installation of the assembly onto a steering wheel column for example. Once the projection was removed, the interconnector is able to rotate. However, the projection could not be replaced on the interconnector meaning that the interconnector was free to rotate if it were ever removed from the column.

SUMMARY OF THE INVENTION

It is an object of this invention to provide a clock spring assembly which is essentially immobile until it is attached to a rotating device.

It is another object of this invention to provide a clock assembly that becomes immobile once it is disengaged from a rotating device.

It is yet another object of this invention to provide a clock spring assembly which requires a high torque to bypass the locked position.

This invention relates primarily to a clock spring interconnector. The clock spring interconnector comprises a housing having a first aperture and a hub having a second aperture. The clock spring interconnector also comprises a coiled conducting means having a first end and a second end. The hub of the clock spring interconnector is rotatably united with the first aperture. The coiled conducting means is located in a radial space defined by the union of the housing and the hub. The first end of the coiled conducting means is connected to a first conductor which is integral to the housing. The second end of the coiled conducting means is connected to a second conductor integral to the hub. This particular clock spring interconnector comprises one or more spring loaded locking devices each integral to the hub and each having a depressed or unlocked position and an undepressed or locked position. Each spring loading locking device includes a coiled compression spring having a first end and a second end which unites the hub and a locking assembly. The coiled compression spring urges the locking assembly to move away from the hub to an undepressed locked position. The locking assembly has a wing, complementary to one or more depressions in the housing. The wing contacts the housing around the periphery of the first aperture. The hub is prevented from rotating when the wing of a locking device encounters a depression in the housing.

In another embodiment, this invention is a clock spring interconnector comprising a housing having a first aperture, a hub having a second aperture, and a coiled conducting means having a first and second end. The hub is rotatably united with the first aperture. The coiled conducting means is located in a radial space defined by the union of the housing and hub. The first end of the coiled conducting means is connected to a first connector which is integral to the housing. The second end of the coiled conducting means is connected to a second connector which is integral to a hub. The clock spring interconnector further comprises two spring loaded locking devices integral to the hub. Each spring loaded locking device has a depressed or unlocked position and an undepressed or locked position. Each spring loaded locking device includes a coiled compression spring and a locking assembly. The coiled compression spring has a first end and a second end an unites the hub and locking assembly. The coiled compression spring urges the locking assembly to move to an undepressed position. The locking assembly has a wing. The wing of each locking assembly contacts the housing around the periphery of the first aperture. The periphery of the first aperture contains two or more depressions. The hub becomes locked when the wing of the locking assembly encounters a complementary depression in the housing. Each depression in the housing has a width sufficient to allow the wing to move within the hub such that the hub is able to rotate about 10° relative to the housing when the wing of each locking assembly is associated with a complementary depression.

DESCRIPTION OF THE DRAWING

In the drawings:

FIGS. 3A, 3B, and 3C show the spring loaded locking devices of the clock spring interconnector in an undepressed, partially depressed and fully depressed position, respectively.

DESCRIPTION OF THE PREFERRED EMBODIMENTS

To summarize, the present invention relates to an improved clock spring interconnector. The clock spring interconnector of this invention is better understood by reference to FIGS. 1-4 which show various aspects of the preferred clock spring interconnector 10. Like elements in the various figures are identified by the same number.

Figure 1:
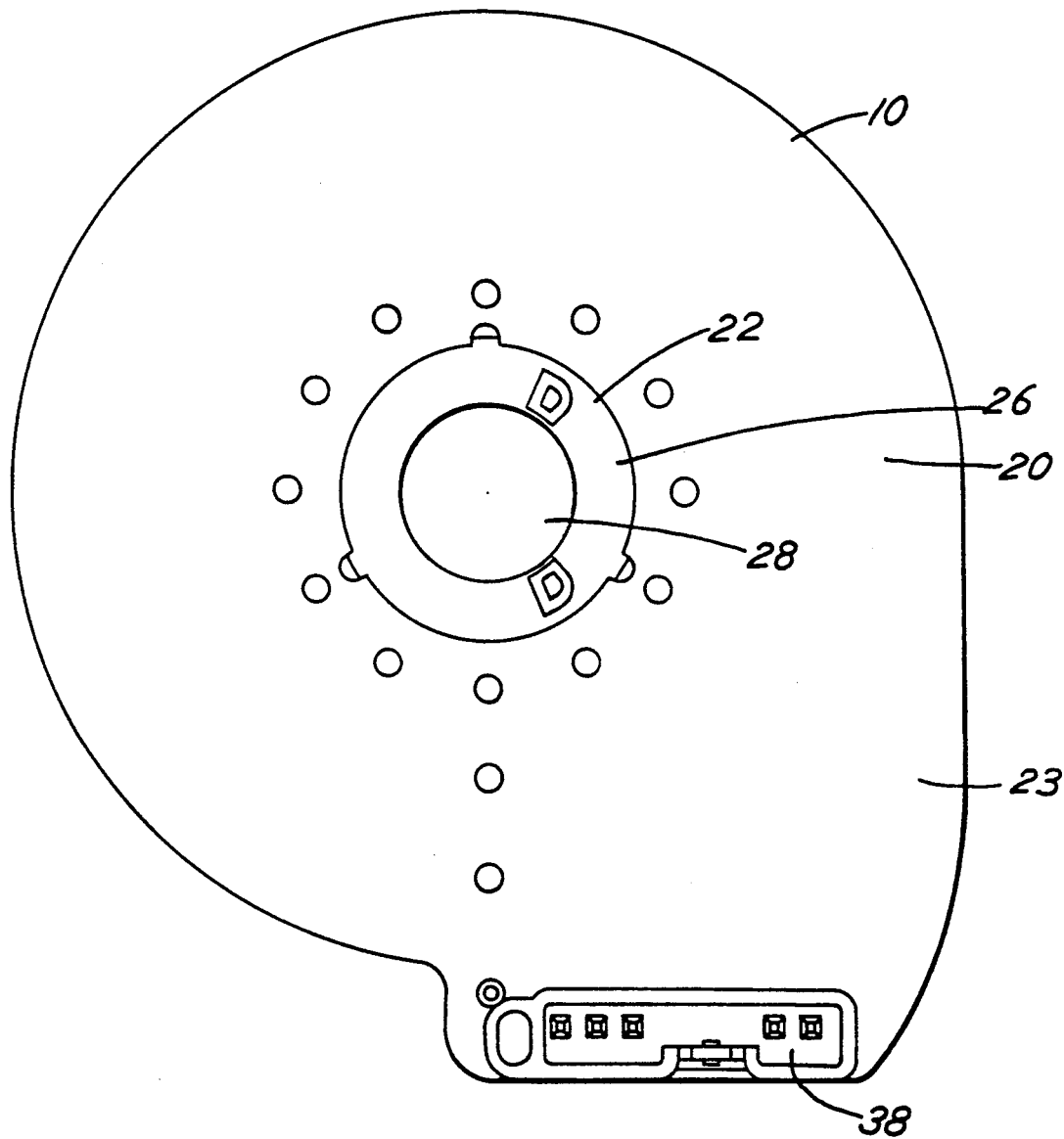
FIG. 1 is a bottom view of the clock spring interconnector of this invention.
Figure 2:
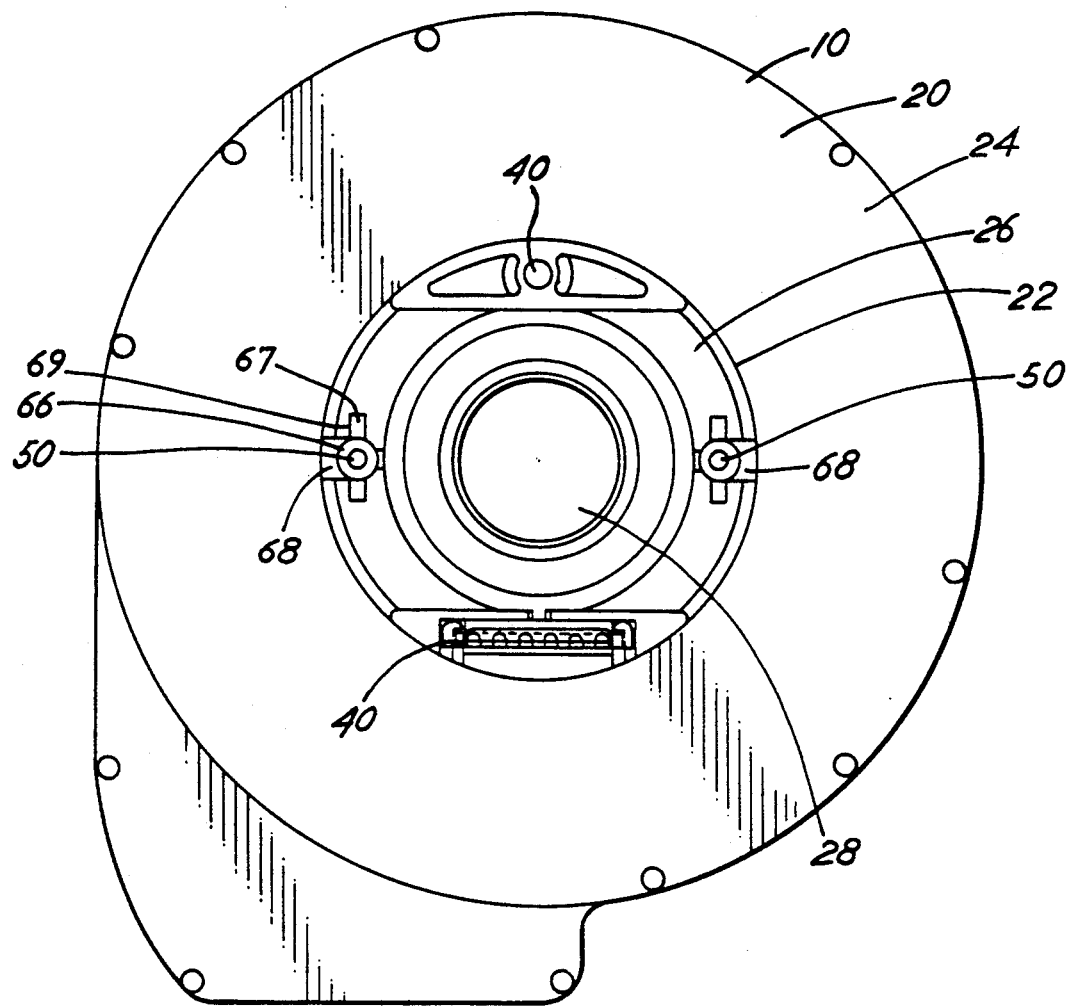
FIG. 2 is a top view of the clock spring interconnector of this invention.

FIGS. 1 and 2 show bottom and top views, respectively, of the clock spring interconnector 10 of this invention. The clock spring interconnector 10 comprises a housing 20 and a hub 26. The housing 20 has a first aperture 22 while the hub 26 has a second aperture 28. The housing 20 includes a first connector 38 while the hub 36 includes a second connector 40.

The hub 26 also includes one or more spring loaded locking devices 50. The spring loaded locking device 50 includes a locking assembly 66 having a key 67 which fits into a slot 69 in the housing. The combination of the key 67 and the slot 69 acts to stabilize the movement of the spring loaded locking device 50 in the hub 26. The spring loaded locking device 50 further includes a wing 68 which contacts the periphery of the housing 20 in the area of the first aperture 22.

FIGS. 3A, 3B, and 3C depict a side view of the clock spring interconnector 10 of this invention. FIG. 3A shows the clock spring interconnector 10 with the spring loaded locking device 50 in an undepressed or locked position, FIG. 3B depicts the spring loaded locking device 50 in an unlocked position midway between a depressed, and undepressed, position. FIG. 3C depicts the spring loaded locking device 50 in a fully depressed, unlocked position. FIGS. 3A, 3B and 3C will be discussed simultaneously below.

The housing 20 and hub 26 combine to define the body of the clock spring interconnector 10 of this invention. The clock spring interconnector 10 has a radial space 36 defined by the combination of the hub 26 and housing 20. A coiled conducting means 30 is located in the radial space 36.

The preferred clock spring interconnector includes two spring loaded locking devices 50. Each spring loaded locking device 50 includes a coiled compression spring 60 and a locking assembly 66. Each spring loaded locking device 50 is integral to the hub 26 and is attached to the hub 26 by a first end of the coiled compression spring 61. A second end of the coiled compression spring 63 is located in a cavity 62 in the locking assembly 66 of the spring loaded locking device 50. The coiled compression spring 60 urges the locking assembly 66 away from the hub 26 to which the first end of the coiled compression spring 60 is attached and towards the housing 20. The locking assembly 66 further includes a wing 68. When the spring loaded locking device 50 is in an undepressed or locked position, as shown in FIG. 3A, the wing 68 is urged into a depression 70 complementary to the wing 68 located at the periphery of the first aperature 22 in the housing 20 by the action of the coiled compression spring 60. When the wing 68 is located in the complementary depression 70, the hub 26 is prevented from rotating about the first aperture 22.

When the spring loaded locking device 50 is in a partially depressed unlocked position as shown in FIG. 3B or in a fully depressed unlocked position as shown in FIG. 3C, the wing 68 of the locking assembly 66 is no longer located in depression 70 and the hub 26 is free to rotate about the first aperture 22 of the housing 20.

Figure 4:
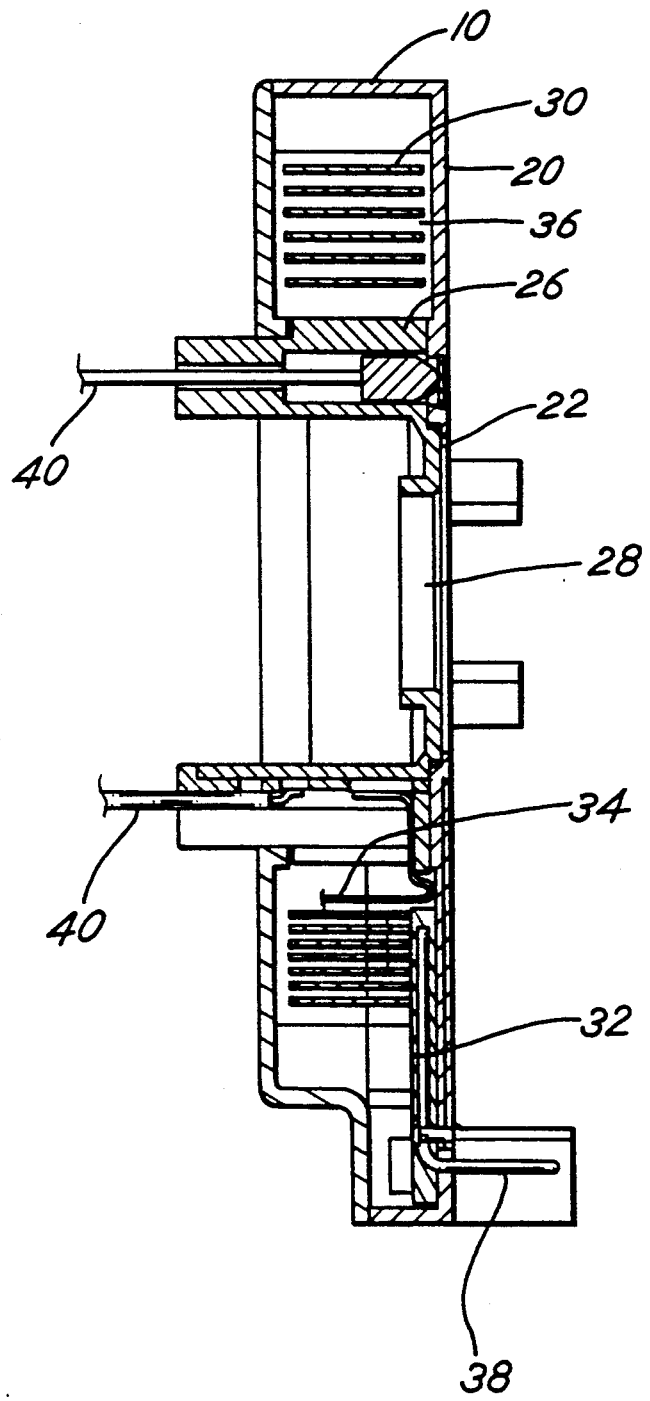
FIG. 4 is a side view of the clock spring interconnector of this invention.

FIG. 4 depicts a preferred embodiment of the clock spring interconnector 20 of this invention. Specifically, FIG. 4 shows the relationship between the coiled conducting means 30 and first connector 38 and second connector 40. The housing 20 and the hub 26 of the clock spring interconnector 10 of this invention combine to form a radial space 36 in which the coiled conducting means 30 is located. The coiled conducting means 30 has a first end 32 which is attached to the first connector 38. First connector 38 is integral to the housing 20. The coiled conducting means also has a second end 34 which is attached to a second connector 40. The second connector 40 is integral to the hub 26 of the clock spring interconnector 10 of this invention.

The clock spring interconnector 10 of this invention is typically attached to a rotating device having some sort of stationary column which passes through the second aperture 28. Attaching the clock-spring interconnector to a rotating device compresses the spring loaded locking devices 50 into a depressed, unlocked position. The hub 26 can then be rotated in conjunction with a rotating device. The rotating device is electrically connected to the clock spring interconnector 10 at the second connector 40. When the rotating device is rotated, hub 26 is able to rotate while maintaining the electrical connection between the rotating device and the clock spring interconnector 10.

Any electrical signal which must reach the rotating device passes from the first connector 38 through the coiled conducting means 30 and to the second connector 40 which is electrically attached to the rotating device. The housing 20 and the first connector 38 remains stationary while the hub 26 rotates in conjunction with the rotating device.

The clock spring interconnector 10 of this invention includes a housing 20. When the clock spring interconnector 10 is attached to a rotating device, the housing portion of the interconnector remains stationary when the rotating device is rotated. For example, if the clock spring interconnector 10 is attached to a steering wheel column, the steering wheel will rotate while the housing 20 remains stationary. The housing 20 would typically be attached to the stationary portion of the steering wheel column. The housing 20 has a first aperture 22. The purpose of the first aperture 22 is to provide a space into which the hub 26 can be placed and also to provide a space for the location of the second aperture 28.

The preferred clock spring interconnector 10 of this invention includes a housing 20 having a base portion 23 and a cover portion 24. The cover portion 24 is attached to the base portion 23 by an attaching means such as a screw, an epoxy material or any other attaching means. Also in a preferred embodiment, the cover portion 24 and base portion 23 of the housing 20 both have an inner dimension defining a first aperture 22. The periphery of the first aperture 22 located on the cover or the base contains one or more depressions 70. The purpose of a depression 70 is to provide a location in which the wing 68 of a spring loaded locking device 50 can become locked in place when the spring load locking device 50 is in an undepressed position. Thus, the depressions 70 are complementary to the wing 68 of each spring loaded locking device 50.

The housing 20 includes a first connector 38. The purpose of the first connector 38 is to provide a location at which an external conducting means such as a wire, plug, a harness or some other conducting means can be attached to the housing 20 and subsequently attached to the first end 32 of the coiled conducting means 30. Preferably, the first connector 38 is an integral connector which contains one or more male or female plugs for uniting the clock spring interconnector housing with an external connector. The external connector would typically unite the clock spring interconnector 10 with sensors, an electronic signal device, or some other device which is intended to convey an electrical signal to the rotating device.

The clock spring interconnector of this invention also includes a hub 26. The hub 26 is rotatably attached to the housing 20 in the proximity of the first aperture 22 of the housing 20. The hub 26 includes a second aperture 28 through which, for example, a column attached to a rotating device is passed. The hub 26 in combination with the housing 20 defines a radial space in which the coiled conducting means 30 is located.

In a preferred embodiment, the hub 26 is located around the periphery of the first aperture 22 and held between the base portion 23 and the cover portion 24 of the housing. The hub 26 contacts the base portion 23 and the cover portion 24 of the housing when it is rotating. A raised edge on the hub 26 contacts the first aperture 22 defined by the cover portion 24 preventing the hub 26 from moving laterally about the housing.

The hub 26 also includes a second connector 40 which is integral to the hub 26. Like the first connector 38, the second connector 40 may be a wire which passes through the hub 26, it may be a plug-type connection or it may be any other connector which is capable of conductively uniting a sensing device or some other device which is in a stationary position, to a rotating device. Additionally, the first and second connectors 38 and 40 may comprise more than one connector integral to the hub 26 or the housing 20. By having more than one connector integral to the hub 26 or housing 20, an electrical signal can be sent from one or more stationary sources to one or more electronic devices located in a rotating device.

The second connector 40 is conductively united with a rotating device. When the device rotates the second connector 40 rotates in conjunction with the rotation of the hub 26. The rotation of the hub 26 causes the coiled conducting means 30 located in the radial space 36 to tighten or relax, much like a watch spring.

The hub 26 contains one or more spring loaded locking devices 50. The purpose of a spring loaded locking device 50 is to prevent the hub 26 from rotating when the spring loaded locking device 30 is in an undepressed, locked position. A spring loaded locking device 50 will typically be in a undepressed locked position whenever the clock spring interconnector 10 is not installed on a column attached to a rotating device. When the clock spring interconnector 10 is attached to a column associated with the rotating device, the spring loaded locking device or locking devices 50 are depressed and become unlocked allowing the hub 26 to rotate in conjunction with the rotating device. When the clock spring interconnector 10 is subsequently removed from the column associated with the rotating device, the spring loaded locking devices 50 again are urged into a undepressed position and become locked when a wing 68 of a spring loaded locking device 50 becomes associated with a complementary depression 70 in the periphery of the first aperture 22, preventing rotation of the hub 26. In this manner, the coiled conducting means 30 cannot become either tightly wound or tightly unwound by rotating the hub 26 when it is not associated with a rotating device.

A spring loaded locking device 50 includes a coiled compression spring 60 and a locking assembly 66. The coiled compression spring 60 unites the hub 26 with the locking assembly 66 to define a spring loaded locking device 50. Preferably, the first end of the coiled compression spring 61 is attached to the hub 26 while the second end of the coiled compression spring 63 is associated with a cavity 62 in the locking assembly to unite the locking assembly 66 with the hub 26. In its assembled position, the coiled compression spring 60 of the spring loaded locking device 50 is always slightly compressed. Therefore, the coiled compression spring 60 is always urging the locking assembly 66 towards the cover of the housing of a preferred clock spring interconnector 10.

The locking assembly 66 includes a wing 68. Preferably, the wing 68 is perpendicularly associated with the main body of the locking assembly 66 and is also perpendicularly oriented with respect to the coiled compression spring 60. The wing 68 of the locking assembly 66 has at least two purposes. First, the wing 68 prevents the locking assembly 66 from being urged beyond the housing 20 by the coiled compression spring 60. The wing 68 accomplishes this purpose by contacting the housing 20 before the coiled compression spring 60 can urge the locking assembly 66 to a point where the coiled compression spring 60 becomes relaxed. It is preferred that the wing 68 contact the cover portion 24 or the base portion 23 of the housing 20 in the proximity of the periphery of the first aperture 22. In this way, the wing 68 will always contact the first aperture 22 of the housing 20 when the spring loaded locking device 50 is in an undepressed position.

The second purpose of the wing 68 of the locking assembly 66 is to provide a means whereby the hub 26 becomes locked and cannot rotate about the first aperture 22. This is accomplished when the wing 68 of the locking assembly 66 is united with a complementary depression 70 located at the periphery of the first aperture 22 of the housing 20. As previously mentioned, the first aperture 22 of the housing 20 contains one or more depressions 70. When the spring loaded locking device 50 is in an undepressed or locked position and the hub 26 is rotated, the wing 68 contacts the periphery of the first aperture 22. When the wing 68 encounters a depression 70 in the housing 20, the coiled compression spring 60 urges the wing 68 into the depression 70. The walls of the depression 70 prevent the wing 68 from traveling further along the dimension of the first aperture 22 of the housing 20, and the urging of the coiled compression spring 60 keeps the wing 68 in the depression 70 locking the hub 26 and preventing it from rotating. It is preferred that the depression 70 is wide enough to allow the hub 26 to rotate approximately 10° when the wing 68 is located in the depression 70. Again, even though the depression 70 is wider than the wing 68, the walls of the depression 70 in combination with the wing 68 will prevent the hub 26 from rotating.

A preferred clock spring interconnector 10 of this invention will have two or more spring loaded locking devices 50 attached to the hub 26. More preferably, there are two spring loaded locking devices 50 attached to the hub 26 of the clock spring interconnector 10 of this invention. These two spring loaded locking devices 50 will generally be located in 180° opposition from one another around the second aperture 28 of the hub 26. The housing 20 will preferably contain as many depressions 70 as there are spring loaded locking devices 50. The depressions 70 are typically located to correspond to the locations of the spring loaded locking devices 50 on the hub 26. If the spring loaded locking devices are offset 180° then the depressions 70 will be offset or in 180° opposition to one another. In this manner, all of the wings 68 will unite with a depression 70 in the housing 20 and will simultaneously be in a locked position. Having more than one wing of a spring loaded locking device 50 complementary to a depression 70 makes it unlikely that the hub 26 can be rotated with a force sufficient to urge the spring loaded locking device 50 out of the depressions 70.

As mentioned above, the hub 26 is allowed to rotate when the spring loaded locking devices 50 are depressed and the wings 68 are urged out of the depressions 70 in the housing 20 by depressing the spring loaded locking device 50. Preferably, the spring loaded locking device 50 which is in an undepressed and locked position 54 will need only to be moved or depressed slightly to be moved into an unlocked position. The spring load locking device 50 will generally be urged into a depressed or unlocked position by uniting the clock spring interconnector 10 with a column which is attached to a rotating device.

When the hub 26 and housing 20 are rotatably united at the first aperture 22, a radial space 36 is formed. The purpose of the radial space 36 is to hold the coiled conducting means 30, and to provide a location where the first end 32 and second end 34 of the coiled conducting means 30 can be attached to the first connector 38 and the second connector 40.

The coiled conducting means 30 is located in the radial space 36. Preferably, the coiled conducting means 30 is resilient enough to allow the hub 26 to rotate at least two complete turns in any direction from a center rotational position while maintaining conductance between the first and second conductor 38 and 40 via the coiled conducting means 30.

The coiled conducting means 30 may be any type of conducting means capable of maintaining an electrical connection between the first and second connectors 38 and 40. The coiled conducting means 30 may be coiled metal foil, a coiled wire, or any other coiled or resilient conducting means. Preferably, the coiled conducting means 30 is about 8 to about 14 feet in length or longer and is made up of an insulated conducting tape. It is preferred that the conducting tape be made up of a conducting material such as copper or any other conducting material sandwiched between mylar. The first end and second end 32 and 34 of the coiled conducting means 30 are conductively attached to the first connector 38 and second connector 40 respectively to provide for the conductive connection between the first and second connectors 38 and 40. Any method known in the art such as welding, soldering the like may be utilized to attach the first and second ends 32 and 34 of the coiled conducting means to the first and second connectors 38 and 40.

The description above has been offered for illustrative purposes only, and is not intended to limit the scope of the invention of this application which is defined in the claims below.

What I claim is:

1. A clock spring interconnector comprising a housing defining a first, central aperture; a hub having a second, central aperture, and coiled, conducting means defining a first end and a second end, said hub being carried in rotatable relation in said housing with said first and second apertures being in registry, to define a radial space within said housing and between said housing and hub, and coiled conducting means carried in said radial space, a first end of the coiled conducting means being connected to a first connector carried by said housing, and a second end of said coiled conducting means being connected to a second connector carried by said hub, the improvement comprising:

one or a pair, at most, of spring-loaded locking devices carried by said hub, each of said spring-loaded locking devices defining a depressed, unlocked position and an undepressed, locking position, each spring-loaded locking device including a coiled compression spring and a locking assembly, said coiled compression spring urging said locking assembly toward said undepressed, locking position, said locking assembly also comprising a wing; said housing defining one or a pair, at most, of depressions proportioned and positioned to receive the wing of a said locking assembly in the undepressed, locked position, said housing defining only as many depressions as there are spring loaded locking devices, whereby said one or pair of spring loaded locking devices can insert their respective wings into said one or pair of depressions, each of said depressions having a width sufficient to allow the hub to turn about 10° relative to the housing when each locking assembly wing is located in a depression.

2. The clock spring interconnector of claim 1 in which a third aperture defined by said hub is of non-circular cross section for mounting on a steering column in a rotatably fixed relation to said column.

3. The clock spring interconnector of claim 2 in which only a pair of said locking devices are present, in essentially 180 degree, opposed relation, and only a pair of said depressions are present in essentially 180 degree, opposed relation.

4. The clock spring interconnector of claim 1 in which only a pair of said locking devices are present, in essentially 180 degree, opposed relation, and only a pair of said depressions are present in essentially 180 degree, opposed relation.

5. The clock spring assembly of claim 1 further characterized in that the coiled compression spring has a first end and a second end, the first end of the coiled compression spring attached to the hub while the second end of the coiled compression spring is located in a cavity in the locking assembly.

6. The clock spring assembly of claim 2 further characterized in that the coiled compression spring has a first end and a second end, the first end of the coiled compression spring attached to the hub while the second end of the coiled compression spring is located in a cavity in the locking assembly.

* * * * *